(12) United States Patent
Price et al.

(10) Patent No.: US 8,172,692 B2
(45) Date of Patent: May 8, 2012

(54) METHOD OF FORMING A HIGH PERFORMANCE THREAD FORMING SCREW

(75) Inventors: David R. Price, Rockford, IL (US); Gary Shattuck, Poplar Grove, IL (US)

(73) Assignee: Acument Intellectual Properties, LLC, Troy, MI (US)

( * ) Notice: Subject to any disclaimer, the term of this patent is extended or adjusted under 35 U.S.C. 154(b) by 275 days.

(21) Appl. No.: 12/510,771

(22) Filed: Jul. 28, 2009

(65) Prior Publication Data
US 2009/0286608 A1   Nov. 19, 2009

Related U.S. Application Data

(62) Division of application No. 11/695,341, filed on Apr. 2, 2007, now abandoned.

(60) Provisional application No. 60/744,974, filed on Apr. 17, 2006.

(51) Int. Cl.
*B23G 9/00* (2006.01)
*B21H 3/02* (2006.01)
(52) U.S. Cl. .................. 470/17; 470/8; 470/10; 470/11
(58) Field of Classification Search ................ 470/8–12, 470/17; 72/286
See application file for complete search history.

(56) References Cited

U.S. PATENT DOCUMENTS

| | | | |
|---|---|---|---|
| 2,953,794 A * | 9/1960 | Klooz | ............................. 470/17 |
| 3,769,103 A | 10/1973 | Wardwell et al. | |
| 3,836,743 A | 9/1974 | Wardwell et al. | |
| 3,894,570 A | 7/1975 | Reynolds | |
| 3,935,785 A | 2/1976 | Lathom | |
| 3,972,084 A | 8/1976 | Reynolds | |
| 4,021,274 A | 5/1977 | Chadwick | |
| 4,112,812 A | 9/1978 | Wardwell et al. | |
| 4,233,880 A | 11/1980 | Bjorklund et al. | |

(Continued)

FOREIGN PATENT DOCUMENTS

DE          101 13 946 A1      9/2002

(Continued)

OTHER PUBLICATIONS

Supplementary European Search Report which issued in connection with corresponding European Patent Application No. 07759995 on Nov. 17, 2011.

*Primary Examiner* — Debra Sullivan
(74) *Attorney, Agent, or Firm* — Clark Hill PLC

(57) ABSTRACT

A thread forming screw having a minimum surface hardness of HRC 56. The screw can form threads in a workpiece having a surface hardness which exceeds HRC 23. A method of surface hardening a screw includes carbon enriching the screw to at least a 0.48 carbon level, and then quenching the screw. Then, the screw is tempered such that the surface hardness does not exceed the core hardness by more than 3 Rockwell C points, and both the surface and core are at a Rockwell C33-C39 hardness. Subsequently, the point is induction hardened, and the screw is quenched again. The screw is again tempered such that the lead threads and the first 3-4 full threads are at a Rockwell C56 minimum hardness, preferably to a depth of at least 0.008 inches, and the core of the fastener is at Rockwell C33-C39 hardness. Finally, a finish is applied.

11 Claims, 2 Drawing Sheets

U.S. PATENT DOCUMENTS

| | | |
|---|---|---|
| 4,842,467 A | 6/1989 | Armstrong |
| 5,000,639 A | 3/1991 | Hinkley et al. |
| 5,211,520 A | 5/1993 | Mckinney |
| 6,035,495 A | 3/2000 | Andersen |
| 6,213,884 B1 | 4/2001 | McCarty |
| 6,338,600 B2 | 1/2002 | Friederich et al. |
| 6,386,810 B1 | 5/2002 | Onoe |
| 7,413,704 B2 * | 8/2008 | Matsuzaki et al. ............ 420/105 |
| 7,641,747 B2 * | 1/2010 | Takayama .................... 148/572 |
| 2004/0235576 A1 * | 11/2004 | Friederich et al. ............... 470/9 |
| 2005/0244247 A1 | 11/2005 | Shinjo |

FOREIGN PATENT DOCUMENTS

| | | |
|---|---|---|
| EP | 1 054 170 A2 | 11/2000 |
| EP | 1 466 990 A1 | 10/2004 |

\* cited by examiner

METHOD OF FORMING A HIGH PERFORMANCE THREAD FORMING SCREW

RELATED APPLICATIONS (PRIORITY CLAIM)

This application is a divisional of U.S. patent application Ser. No. 11/695,341, filed Apr. 2, 2007, entitled "High Performance Threadforming Screw" which, in turn, claims the benefit of U.S. Provisional Application Ser. No. 60/744,974, filed Apr. 17, 2006. U.S. patent application Ser. No. 11/695,341 and U.S. Provisional Patent Application Ser. No. 60/744,974 are incorporated herein by reference in their entireties.

BACKGROUND

The present invention generally relates to thread forming screws and methods of forming same, and more specifically relates to a fastener, such as a thread forming screw, at least a portion of which has a minimum surface hardness of HRC 56 (Rockwell Hardness C-scale), and to a method of forming such a thread forming screw.

Currently, the industry recommends that thread forming screws be able to cold form threads in a workpiece having a hardness of Rockwell C23 and below. As such, current thread forming screws are sufficiently hard to cold form threads in such workpieces. However, there are some applications where it would be desired to have a thread forming screw be able to form threads in a workpiece which has a hardness which exceeds HRC 23. For example, after High Strength Low Alloy (HSLA) material is formed, such as by punching holes in the material, the hardness in and around the hole area could reach and exceed a Rockwell C40 hardness.

Conventional thread forming screws are not hard enough to successfully cold form threads into workpieces which exceed a Rockwell C23 hardness. For example, some commercially available thread forming screws are processed so that the point and the first three to four full threads are at a Rockwell C45 minimum hardness, and the core of the fastener is at Rockwell C33 to 39 hardness. A thread forming screw such as this is not hard enough to consistently cold form threads into a material which exceeds HRC 23. When driving such a thread forming screw into HSLA material (or any other material) having a hardness of HRC 40 or more, thread collapse occurs. This collapse, or deformation of the threads, causes joint failure. When forming threads in materials such as steel, it is required to have the fastener have a hardness much greater than the material into which the fastener is being threaded, in order to form the threads properly without collapsing.

Because current thread forming screws are not sufficiently hard to cold form threads into workpieces having a hardness which exceeds HRC 23, in such cases it has been necessary to provide mating threads, such as by providing a threaded joint in the workpiece (which requires a drill and tap operation), or by providing weld nuts, loose nuts, a weld boss, threaded inserts, or by providing a similar feature or using a similar method for providing mating threads. These structures/methods require additional operations, hardware and time, resulting in a more costly, time-consuming process.

As such, a market exists for fasteners capable of forming threads in workpieces, such as HSLA material or any other material, which has a hardness which exceeds Rockwell C23.

OBJECTS AND SUMMARY

An object of an embodiment of the present invention is to provide a thread forming screw at least a portion of which has a surface hardness that is sufficiently high such that the thread forming screw can be used to cold form threads in a workpiece which has a hardness that exceeds HRC 23.

Another object of an embodiment of the present invention is to provide a thread forming screw at least a portion of which has a minimum surface hardness of HRC 56.

Still another object of an embodiment of the present invention is to provide a thread forming screw which has a minimum surface hardness of HRC 56, at least to a depth of 0.008 inches, for at least some of the threads of the screw.

Briefly, and in accordance with at least one of the foregoing objects, an embodiment of the present invention provides a thread forming screw which has a head and a threaded shank extending from the head. At least some of the threads of the shank are surface hardened, preferably to a minimum surface hardness of HRC 56, thereby enabling the thread forming screw to thereafter be used to cold form threads in a workpiece having a surface hardness which exceeds HRC 23.

Another aspect of the present invention provides a method of forming such a thread forming screw. The method includes performing a heat treating process whereby the screw is carbon enriched to at least a 0.48 carbon level, and is quenched, such as in oil. Then, the screw is tempered in order to lower the brittleness and to allow for a more ductile core. Preferably, the tempering is controlled such that the surface hardness does not exceed the core hardness by more than 3 Rockwell C points. Preferably, after the tempering, both the surface and core of the fastener are at a Rockwell C33 to 39 hardness. Subsequently, the point, such as the lead threads and three to four full threads of the screw, is induction hardened and the screw is quenched, such as in water or in a synthetic quench. Then, the screw is tempered again to a lower brittleness. Preferably, this tempering step is controlled such that, for example, the lead threads and the first three to four full threads are at a Rockwell C56 minimum hardness, preferably to a depth of at least 0.008 inches, and the core of the fastener is at Rockwell C33 to 39 hardness. Finally, preferably a finish is applied to the fastener.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DESCRIPTION

Figure 1:
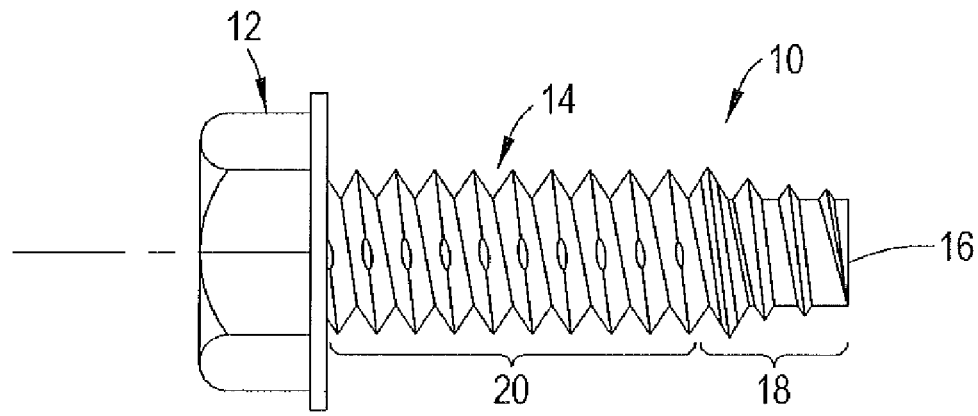
FIG. 1 is a side view of one type of screw which can be surface hardened in accordance with an embodiment of the present invention.

While the present invention may be susceptible to embodiment in different forms, there is shown in the drawings, and herein will be described in detail, an embodiment thereof with the understanding that the present description is to be considered an exemplification of the principles of the invention and is not intended to limit the invention to that as illustrated and described herein.

One aspect of the present invention relates to a fastener, such as a thread forming screw, at least a portion of which has a surface hardness of HRC 56. Another aspect relates to a method of surface hardening a fastener, such as a thread forming screw, such that at least a portion of which has a surface hardness of HRC 56. While the method can be used in connection with a wide range of screws, U.S. Pat. No. 3,935,785 discloses a screw with which a method in accordance with an embodiment of the present invention can be used, and the '785 patent is hereby incorporated herein by reference in its entirety.

Figure 2:
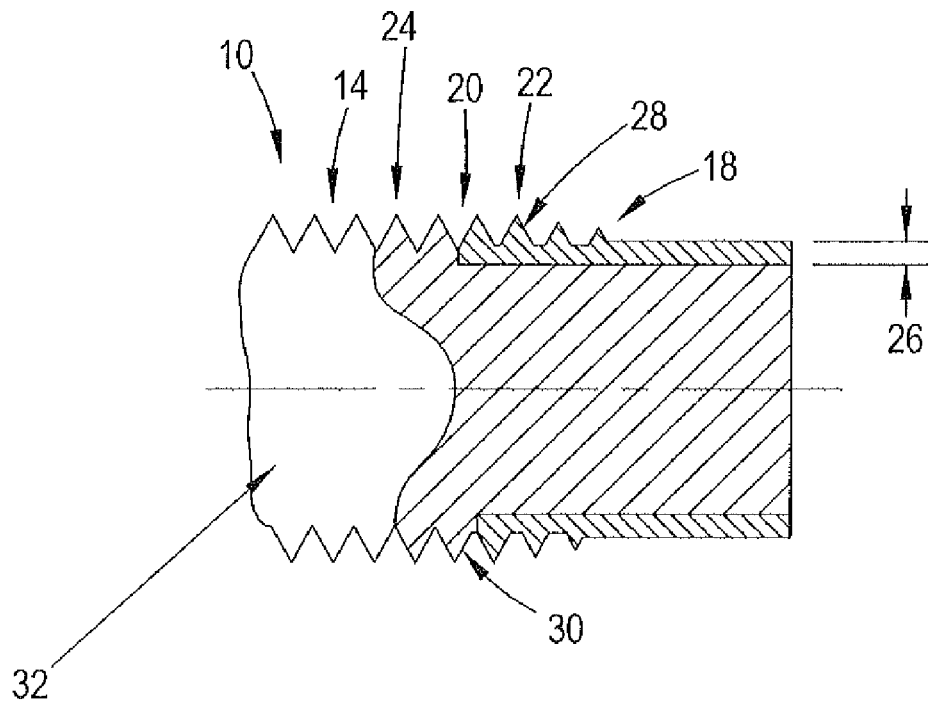
FIG. 2 is a partial cross-sectional diagram of the screw shown in FIG. 1.

As shown in the '785 patent and in FIG. 1 of the present application, the screw 10 includes a head 12 and a threaded shank 14 which extends from the head 12. Proximate the end 16 of the screw 10, opposite the head 12, are a plurality of lead threads 18 which taper somewhat to the point 16 of the screw 10. Between the lead threads 18 and the head 12 are a plurality of full threads 20, wherein reference numeral 22 identifies the first full thread and reference numeral 24 identifies the fourth full thread. More detail regarding the shape and function of this particular screw can be found in the '785 patent. However, an example of a preferred, specific embodiment of the present invention provides as shown in FIG. 2, wherein the lead threads 18 as well as the first three or four full threads of the screw, are surface hardened to a Rockwell hardness of at least HRC 56, to a depth (i.e., dimension 26 identified in FIG. 2) of at least 0.008 inches. Preferably, the core of the screw 10 is at Rockwell C33 to 39 hardness, such that the screw 10 has a relatively ductile core. As shown in FIG. 2, the portion identified with reference numeral 28 has a minimum induction hardened area at HRC 56 min., while the portion identified with reference numeral 30 has a maximum induction hardened area at HRC 56 min. The portion identified with reference numeral 32 is a hardened, quenched, and tempered area, having a surface hardness within 3 points HRC of the core.

Figure 3:
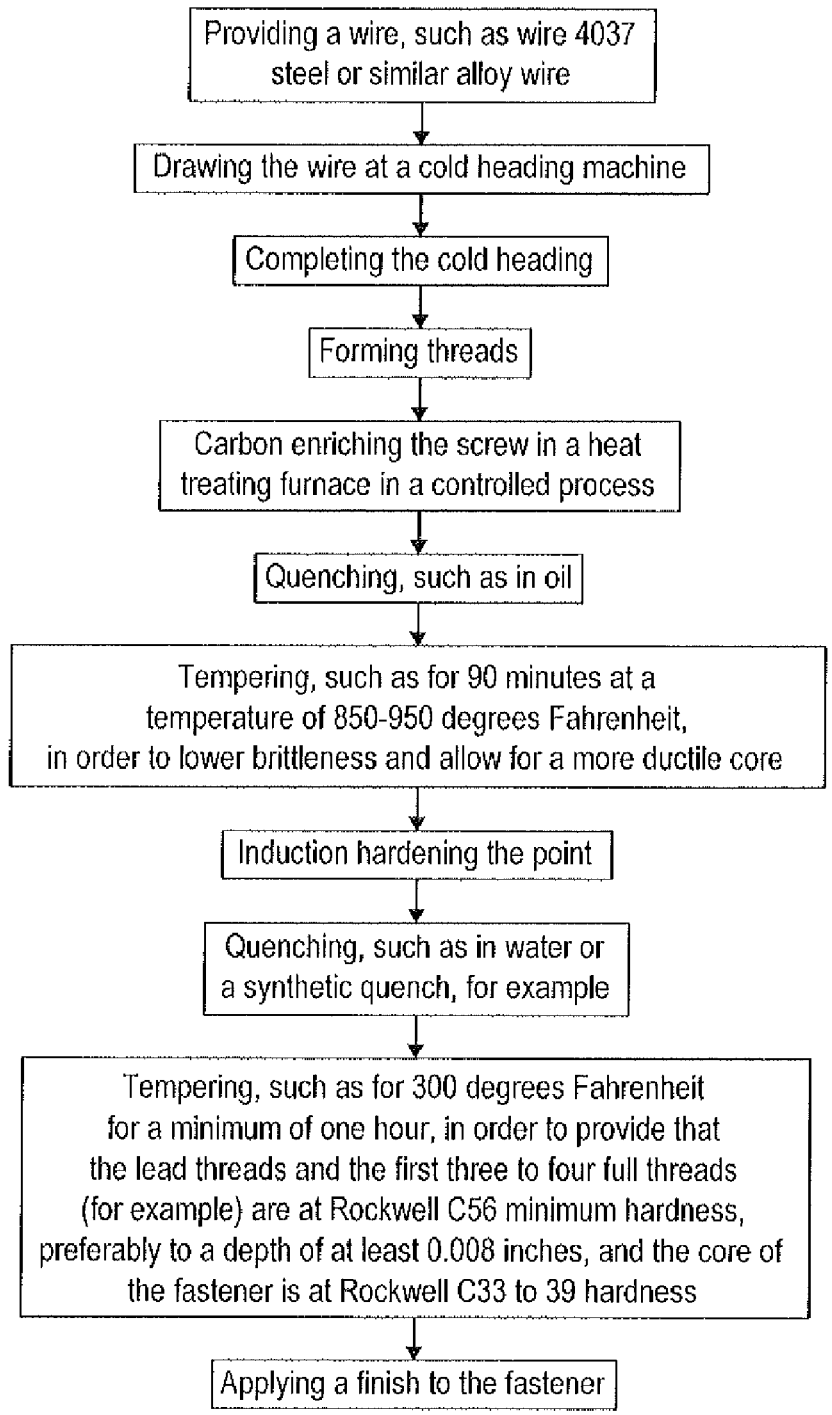
FIG. 3 is a flow chart illustrating a method of making a surface hardened thread forming screw, where the method is in accordance with an embodiment of the present invention.

FIG. 3 illustrates a method which is accordance with an embodiment of the present invention, and the method can be used to form a thread forming screw 10 such as shown in FIGS. 1 and 2. The method provides that, for example, a wire made of steel 4037 steel or a similar alloy is provided, and the wire is drawn at a cold heading machine. The material may be an alloy steel, AISI C4037 grade analysis with a composition of: carbon 0.35-0.40 percent; manganese 0.70-0.90 percent, sulphur 0.040 percent max., phosphorous 0.035 percent max., silicon 0.20-0.35 percent and molybdenum 0.20-0.30 percent, normally specified as killed, fine grain, spherodized annealed steel. Of course, other material may be used while staying entirely within the scope of the present invention. Once the cold heading is completed, threads are formed on the screw. These steps are conventional and well known.

Once the screw is formed, a heat treating process in accordance with an embodiment of the present invention is performed. In the heat treating process, the screw is carbon enriched using a controlled process, in a quality furnace, such that the screw obtains at least a 0.48 carbon level. The carbon enrichment allows the surface of the fastener to be hardened harder than the base material. Specifically, the screw can be left in the furnace for 90 minutes while the furnace is at 1600-1700 degrees Fahrenheit. The furnace atmosphere is preferably controlled to 0.6 to 0.7% carbon potential (with no nitriding). Preferably, the depth (i.e., dimension 26 in FIG. 2) of the carbon restored zone is at least 0.008 inches. Preferably, the surface hardness after tempering (at the temperature selected for the core requirement) does not exceed the core hardness by more than 3 Rockwell C (30 Vickers) points equivalent. A 1 to 2 Rockwell C (10-20 Vickers) equivalent surface hardness increase would be an objective in selecting furnace parameters. A microhardness tester can be employed to measure the hardness and depth of the carbon restored zone, in order to help set the furnace parameters.

Once the screw is carbon enriched, the screw is quenched, such as in oil at 140-160 degrees Fahrenheit. After quenching, the screw is tempered, such as for 90 minutes at a temperature of 850-950 degrees Fahrenheit, in order to lower the brittleness and allow for a more ductile core in the fastener. Preferably, this step is controlled such that the surface hardness does not exceed the core hardness by more than 3 Rockwell C points). At this point, preferably both the surface and the core of the fastener are at a Rockwell C33 to 39 hardness.

Subsequently, the point of the screw, such as the lead threads 18 and the first three to four full threads, is induction hardened, wherein the lead threads of the fastener are momentarily fed into the influence of an electric field in such a way as to induction heat the threads to the hardening temperature (approximately 1650-1750 degrees Fahrenheit). The screw is thereafter immediately quenched, such as in water spray or viz-a-viz a synthetic quench.

Subsequently, the screw is tempered, such as at 300 degrees Fahrenheit for a minimum of one hour, in order to lower the brittleness. This tempering step along with the previous carbon enrichment step preferably effectively combine to provide that the lead threads and the first three to four full threads are at a Rockwell C56 minimum hardness, preferably to a depth of at least 0.008 inches, and the core of the fastener is at Rockwell C33 to 39 hardness. While different tempering temperatures and durations may be used, preferably the temperature is sufficiently low to keep the point at a Rockwell C56 minimum hardness. Finally, preferably a finish is applied to the fastener.

One aspect of the present invention provides a fastener at least a portion of which has a minimum surface hardness of 56 HRC. For example, the fastener could be a thread forming screw such as is shown in U.S. Pat. No. 3,935,785, where the lead threads and the first three or four full threads have a minimum surface hardness of 56 HRC. As such, the screw can be used to cold form threads into a workpiece which has a hardness which exceeds 23 HRC, such as HSLA material or any other material having a hardness of 40 HRC or more.

Another aspect of the present invention provides a method of surface hardening at least a portion of a fastener, such as the thread forming screw shown in U.S. Pat. No. 3,935,785, such that at least a portion of the screw has a minimum surface hardness of 56 HRC. For example, the lead threads and the first three or four full threads have a minimum surface hardness of 56 HRC, whereby the screw can be used to cold form threads into a workpiece which has a hardness which exceeds 23 HRC, such as HSLA material or any other material having a hardness of 40 HRC or more.

Still another aspect of the present invention provides a product by process, specifically a fastener made by using the process described hereinabove.

While embodiments of the present invention are shown and described, it is envisioned that those skilled in the art may devise various modifications of the present invention without departing from the spirit and scope of the disclosure. For example, while it is described above that the surface hardness can be effected with regard to lead threads and the first three or four lead threads, the surface hardness can be implemented with regard to either more or less threads while staying fully within the scope of the present invention. Additionally, while the foregoing description specifically discusses HSLA material, the present invention can be used to form threads into other material besides HSLA material.

What is claimed is:

1. A method for forming a thread forming screw which is configured to cold form threads in a workpiece having a surface hardness which exceeds HRC 23, said method comprising:
   providing a wire made of steel;
   drawing the wire at a cold heading machine to form a head and a shank extending from the head to a free end;
   forming threads on the shank to form a screw, wherein the formed threads comprise full threads proximate to the head and lead threads between the full threads and the free end;
   performing a heat treating process on the screw, by first carbon enriching the screw to provide that a surface hardness of the screw is at a Rockwell C33 to 39 hardness and to provide that the surface hardness of the screw does not exceed a core hardness of the screw by more than 3 Rockwell C points, and by second induction hardening the lead threads and at least three of the full threads of the screw that are provided closest to the lead threads, such that the induction hardened threads have a surface hardness of at least HRC 56.

2. A method of forming a thread forming screw as recited in claim 1, further comprising quenching and tempering the screw after carbon enriching the screw and before induction hardening the lead threads and the at least three full threads of the screw that are provided closest to the lead threads.

3. A method of forming a thread forming screw as recited in claim 1, further comprising quenching and tempering the screw after induction hardening the lead threads and the at least three full threads of the screw that are provided closest to the lead threads.

4. A method of forming a thread forming screw as recited in claim 1, wherein the step of carbon enriching the screw comprises leaving the screw in a furnace for 90 minutes while the furnace is at 1600-1700 degrees Fahrenheit while controlling the furnace atmosphere to 0.6 to 0.7% carbon potential, wherein a depth of a carbon restored zone of the screw is at least 0.008 inches.

5. A method of forming a thread forming screw as recited in claim 1, further comprising quenching and tempering the screw after carbon enriching the screw and before induction hardening the lead threads and the at least three full threads of the screw that are provided closest to the lead threads, wherein the step of quenching the screw comprises quenching the screw in oil at 140-160 degrees Fahrenheit.

6. A method of forming a thread forming screw as recited in claim 1, further comprising quenching and tempering the screw after carbon enriching the screw and before induction hardening the lead threads and the at least three full threads of the screw that are provided closest to the lead threads, wherein the step of tempering the screw comprises tempering the screw for 90 minutes at a temperature of 850-950 degrees Fahrenheit.

7. A method of forming a thread forming screw as recited in claim 1, wherein the step of induction hardening the lead threads and the at least three full threads of the screw that are provided closest to the lead threads comprises momentarily feeding the screw into the influence of an electric field in such a way as to induction heat the lead threads and the at least three full threads of the screw that are provided closest to the lead threads to a hardening temperature of 1650-1750 degrees Fahrenheit.

8. A method of forming a thread forming screw as recited in claim 1, further comprising quenching and tempering the screw after induction hardening the lead threads and the at least three full threads of the screw that are provided closest to the lead threads, wherein the step of tempering comprises tempering the screw at 300 degrees Fahrenheit for a minimum of one hour, thereby lowering a brittleness of the screw, wherein the tempering step and the carbon enrichment step provide that the induction hardened threads are at a Rockwell C56 minimum hardness, to a depth of at least 0.008 inches.

9. A method of forming a thread forming screw as recited in claim 1, further comprising quenching and tempering the screw after induction hardening the lead threads and the at least three full threads of the screw that are provided closest to the lead threads, wherein the tempering step and the carbon enrichment step provide that the induction hardened threads are at a Rockwell C56 minimum hardness, to a depth of at least 0.008 inches.

10. A method of forming a thread forming screw as recited in claim 1, further comprising providing that the wire comprises an alloy steel, AISI C4037 grade analysis with a composition of: carbon 0.35-0.40 percent; manganese 0.70-0.90 percent; sulphur 0.040 percent max.; phosphorus 0.035 percent max.; silicon 0.20-0.35 percent; and molybdenum 0.20-0.30 percent.

11. A method of forming a thread forming screw as recited in claim 1, wherein the step of carbon enriching the screw comprises carbon enriching the screw such that the screw obtains at least a 0.48 carbon level.

* * * * *